Feb. 16, 1965     W. STEUBER     3,169,899
NONWOVEN FIBEROUS SHEET OF CONTINUOUS STRAND MATERIAL
AND THE METHOD OF MAKING SAME
Filed March 22, 1961     2 Sheets-Sheet 2
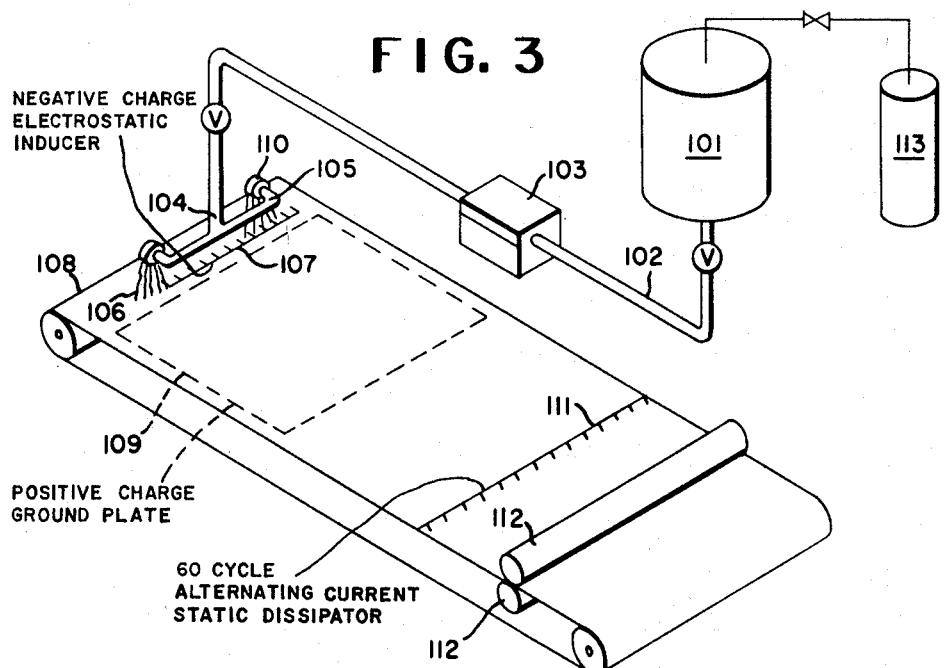
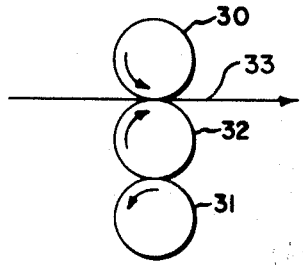
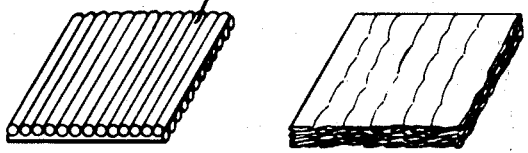
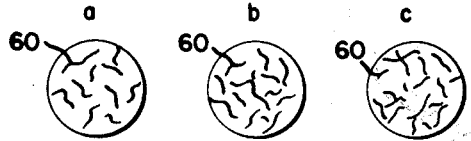
INVENTOR
WALTER STEUBER
BY Sol Schwartz
ATTORNEY 3,169,899
NONWOVEN FIBEROUS SHEET OF CONTINUOUS STRAND MATERIAL AND THE METHOD OF MAKING SAME
Walter Steuber, Media, Pa., assignor to E. I. du Pont de Nemours and Company, Wilmington, Del., a corporation of Delaware
Filed Mar. 22, 1961, Ser. No. 97,496
25 Claims. (Cl. 161—72)

This invention relates to fibrous sheets and more particularly to coherent, nonwoven, sheets made from fine-dimensioned, long fibrous elements of synthetic organic polymers. One type of sheet contemplated herein is a consolidated, coherent, flexible, nonwoven sheet. Another type is one which is thicker than that previously mentioned and which is a relatively inflexible, consolidated, coherent nonwoven sheet. The invention also relates to articles obtained by coating, laminating and impregnating such sheets.

This application is a continuation-in-part of my application Serial No. 68,111, filed November 8, 1960, and now abandoned.

Copending and coassigned U.S. patent application Serial No. 858,725 now abandoned, and Belgian Patent 568,524 describe a novel flash-spinning process which economically produces an unusual, new, fine-dimensioned fibrous polymeric material called a plexifilament. The plexifilament is essentially a yarn-like strand comprising an integral open network or plexus of randomly and cohesively united filmy polymeric material. The filmy material generally has an average thickness smaller than 4 microns and the strand has a surface area greater than 2 square meters per gram. As a continuous strand, plexifilament material is disclosed to have utility in weaving, knitting, rope making, and analogous applications. However, procedures and products have not hitherto been realized wherein continuous plexifilament lengths are utilized in the production of useful nonwoven sheet products. The difficulties involved in forming uniform sheets of plexifilament material are magnified when it is in a form other than yarn-like strands, such as flat web-like material made as described below.

Nonwoven sheets are generally less costly than woven sheets of the same fibrous material insofar as the weaving operation has been obviated. To achieve adequate structural coherency and stability, nonwoven structures ordinarily must be treated in some manner to cause a consolidation of the fibrous material to provide a coherent sheet having improved gross sheet properties. At minimum, the sheet must have sufficient strength to retain its identity when handled manually or by machine. Thus, for example, sheet structures, having a tensile strength below about 0.3 lb./in.//oz./yd.$^2$, are not useful for commercial purposes unless their tensile strength is improved, since they generally do not retain their dimensions on handling due to their own weight regardless of precautions taken.

The use of adhesive binders, or of felting or fiber intertangling operations to achieve an adequate degree of coherency is costly and offsets the economic advantage gained by the avoidance of the weaving operation. Structures which employ a water-sensitive binder, or which have been consolidated by a wet-felting technique generally possess poor strength when wet. The wet-laid sheets such as are made by a paper-making process do not comprise overlapping and intersecting layers and the particles which go into such sheets are beaten and fractured. The physical characteristics of these sheets are such as to render them much weaker in both tensile and tear strength compared to the products of the present invention when prepared from the same materials and subjected to the same conditions of temperature and pressure.

In many instances, the nonwoven sheets of the prior art have adequate strength in one (the machine) direction but little or no strength in a transverse direction. This is unsatisfactory in those applications where sheets, substantially isotropic with regard to tensile strength, are required. By "substantially isotropic" is meant having a tensile strength in one direction in the major plane of said sheet which is less than twice the tensile strength in a 90° transverse direction.

It is an object of the present invention to provide economical, flexible fibrous sheets from synthetic organic polymers. It is another object to prepare a coherent, flexible, nonwoven sheet having high strength in either the dry or wet state from plexifilament material without the use of adhesive binding agents or a fiber intertangling operation. It is a further object to prepare self-bonded sheets, flexible or inflexible, by simple and economical consolidation procedures. A still further object is to prepare nonwoven sheets having substantially isotropic properties. Other objects and advantages will become apparent in the course of the following description of the invention.

In general, the novel sheet products of the present invention have a tensile strength greater than 0.3 lb./in.//oz./yd.$^2$. When formed from unconsolidated sheets (as initially laid down and without any further treatment) which have been evenly compressed, they are substantially uniform in appearance and are free from gross variations in thickness, texture, stiffness or opacity and under such conditions they have a bulk density greater than about 7 lbs./ft.$^3$ to achieve the required tensile strength. The unconsolidated sheet, or batt is extremely bulky, easily compressible and of low resilience. The unpressed sheet of bulk density 0.8 lb./ft.$^3$ has little strength and cannot be handled due to ease of separation of strands from the surface. However, the sheet may be "embossed" or "quilted" with a pattern resulting in a handlable (tensile >0.3 lb./in.//oz./yd.$^2$) though still bulky (1.9 lbs./ft.$^3$ overall bulk density) sheet.

The sheets are made from synthetic, polymeric material in the form of an integral network of primarily ribbon-like, fibrous elements whose cross sections vary along the length of the elements. This structure may be readily identified by tearing the sheet thereby exposing some fibrous elements, removing one or more of these fibrous elements and examining consecutive, transverse cross sections under a magnification of 450×. The transverse cuts along the length of the elements may be made in a manner well known in the art by the use of a microtome. In addition, these filmy, ribbon-like elements have an average thickness below 4 microns.

Within the sheet structure, the polymeric material is arranged in overlapping and intersecting layers. The overlapping is apparent in the sheet structure from the fact that substantial amounts of fibrous elements are aligned in directions transverse to each other. This can be readily determined as by tearing the sheet. It will be noted that fibrous elements are exposed running in directions which bridge the tear. The torn portion is then torn in a 90° transverse direction to the original tear. Fibrous elements are again noted which bridge the tear. These elements run in a transverse direction to the elements bridging the original tear thus establishing the overlapping and intersecting nature of the layers. If overlapping were not present the fibrous elements would all appear to run generally in the same direction as they do in the as-spun plexifilamentary material described in the aforementioned patent. The overlapping of the layers is extremely significant with regard to the properties of the sheet structure. When a substantial number of fibrous elements run in all directions within the plane of the sheet, the sheet is substantially isotropic in all directions as discussed above. By control of the degree of overlapping and intersection of the layers it is thus possible to vary the relationship between the tensile or tear properties in transverse directions.

The sheet products of the present invention are made from filamentary strands. These strands may be incorporated into the sheet structure in substantially the same form as they issue from the spinneret orifice which may be circular, slotted or other irregular shape. The strands appear in fluffy form not unlike that of wool knitting yarns. The strand however, may be flattened to a great extent prior to being incorporated into the sheet structure by use of deflection devices described in more detail below. In either case, the polymeric material comprises an integral network of primarily ribbon-like, fibrous elements which combine and separate at random longitudinal and cross-sectional intervals in the unitary strand structure. The appearance of the strand material when flattened in the course of its preparation by impingement on a deflector differs to an extent from the filamentary strands obtained merely by extrusion through orifices. In the latter case, the polymeric strand is nearly circular in cross-section whereas in the former case, the polymeric network is flat in appearance. Because of the manner in which the filamentary strand material is prepared, the fibrous elements extend generally in the direction in which the strand is spun.

It is greatly preferred that the sheet products of the present invention be made from continuous filamentary strands. By the term "continuous filamentary strands" is meant filamentary strands having a length of at least about 5 inches. The use of indefinitely continuous filamentary strands is especially preferred for the production of sheets of improved strength and uniformity. However, staple having lengths down to about one inch may also be used in making the nonwoven sheets. Thus, continuous strand material can be removed from the sheet products of the invention which will have a length of at least one inch and preferably much longer. On the other hand, the wet-laid sheets referred to earlier would yield particles which average far below one inch in length. The latter figure can be determined by working a wet-laid sheet and disintegrating in water with a wetting agent. The separated fibers may then be removed, dried and measured.

The highly fibrillated type of plexifilament strand disclosed in the aforementioned application and patent, and which consists of an interconnected network of fibrous elements (or film fibrils), consisting of rolled up, filmy material having an average thickness below 4 microns, is especially preferred. The tunneled morphology described in the aforementioned application also yields sheet structures, but these differ substantially from those produced from the highly fibrillated structures. For one thing, their tear strength is less but more significantly they are poorer in covering power as can be seen when sheets of the same basis weight made from similar denier strand material are compared. The fibrous elements of such sheets appear as the walls of irregularly shaped tunnels. The walls consist of essentially the same pellicular material which constitutes the filmy fibrous elements of the fibrillated structures and may be imbedded or connected by film-like material having the same composition and thickness. The structure may be observed in a manner analogous to that set forth above for the fibrillated structure.

The strands may be prepared from solid high molecular weight, fiber-forming polymers, preferably crystalline polymers having more than about 30% crystallinity as measured by X-ray diffraction methods. Hydrophobic polymers are especially preferred whenever insensitivity to moisture is desired in the sheet product. Hydrophobic polymers may generally be considered to be those polymers which are not wetted by water and which have a moisture regain of less than about 5% at room temperature and 70% relative humidity. Polymers which may be used are found in the classes of addition and condensation polymers. Among addition polymers, the polyhydrocarbons, particularly linear polyethylene are preferred and blends of linear polyethylene and minor amounts of branched polyethylene, polypropylene, polybutene, polyisobutylene, polybutadiene, polyvinyl chloride, or cellulose acetate are sometimes particularly advantageous and are within the scope of the invention.

Among the condensation polymers which can be used are polyamides, polyesters, polyacetals, polyurethanes and polycarbonates.

The plexifilament strands may contain a wide range of additives which will impart special properties to the sheet product. Common additives may be present such as waxes, dyes, pigments, antioxidants, delustrants, antistatic agents, reinforcing particles, adhesion promoters, bactericidal agents, dye promoters, removable particles, ion exchange materials, ultraviolet light stabilizers, and other additives customarily employed in the textile, paper and plastics industries. In addition high modulus reinforcing fibers such as glass fibers may be blended with the plexifilamentary yarn in the sheet. Mixed adhesion effects may be obtained by employing a blend of different reinforcing fibers, or by treating a part of the fibers to alter their adhesiveness toward the polymer of the plexifilament.

To better understand the invention, reference may be made to the attached drawings.

FIGURE 3 is a schematic view of an alternative sheet-forming apparatus.

FIGURE 4 is a side elevational view of a calender device employed in making high density sheet structures.

FIGURE 5 is an oblique view of a sheet structure of the present invention.

FIGURE 6 is a fragmentary view of an additional embodiment of a sheet structure.

FIGURES 7a, b, and c are schematic views of cross sections taken along the length of a fibrous element torn from a sheet structure.

Figure 1:
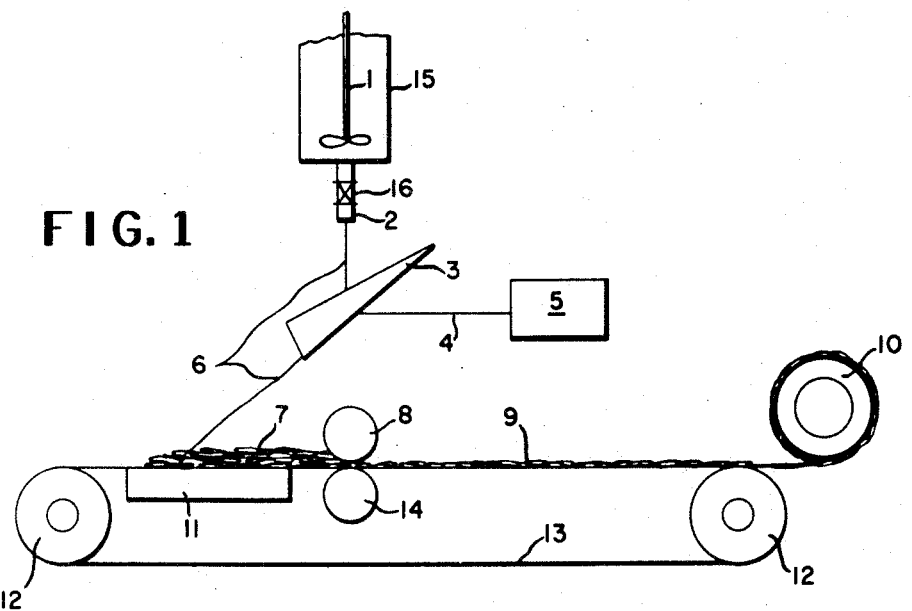
FIGURE 1 is a schematic view of equipment for performing the sheet-forming process.

Referring now to FIGURE 1, autoclave 15 equipped with agitator 1, discharge valve 16, and spinneret 2 is charged with polymer and solvent and brought up to the required temperature and pressure. Valve 16 is then opened and a plexifilamentary strand 6 issues from spinneret 2, impinges on V-shaped trough 3 and is deflected as a wide sheet onto moving belt 13. The trough is attached at a point on the underside to a horizontal shaft 4 driven by oscillator 5 with the large end of the trough pointing down. The horizontal shaft is positioned on an axis parallel to the direction of the belt. The trough oscillates and the plexifilamentary strand is deflected toward the upstream end of the belt. The belt 13 may consist of a continuous band of 20-mesh wire and moves around tensioning and driving rollers 12 and supporting roller 14. Underneath the belt in the region of impingement of the strand with the belt is a suction box 11 to aid in forming the batt. The batt 7 as formed on the belt is shown compressed to sheet 9 by compression roll 8 and collected on windup roll 10.

Figure 2:
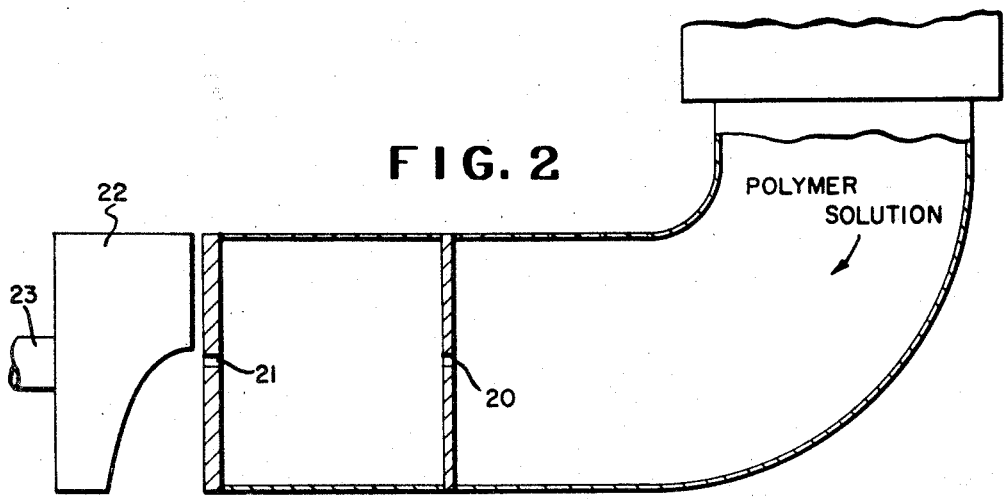
FIGURE 2 is a sectional view of a spinneret device which forms an expanded plexifilament strand.

The spinneret device of FIG. 2 shows the flow of polymer solution from the autoclave (the arrow indicating the direction of flow) through an orifice 20, then through spinneret hole 21 and finally impinging on deflector 22. The plexifilament yarn is deflected and spread by the deflector which is oscillated via shaft 23 during spinning.

In FIG. 3 autoclave 101 is charged with a polymer and solvent then brought up to the desired temperature and pressure by heating and with the addition of a gas from pressure chamber 113. The solution is then passed through transfer line 102, through filter 103 and through transfer line 104, and through dual spinnerets 105, each constructed in accordance with FIG. 2. The yarn is then deflected and spread by impingement on the deflector into a web 106 of a width which is many times the orifice diameters at a distance one foot away from the orifice. Below the spinneret, the yarn passes through an electrostatic field induced through bar 107. The field serves to increase filament separation and improve pinning of the web to a moving endless neoprene belt 108 located below the spinneret. A second plate 109 is located immediately under the neoprene belt to guide the yarn by attraction during the deposit. The web is traversed in the cross-belt direction by oscillation of the deflector 110 through a shaft on which it is mounted. Static dissipator 111 is located over the belt and pressure roll 112 consolidates the sheets.

The calender shown in FIG. 4 consists of a frame containing two stainless steel rolls 30 and 31 which are internally heated by steam and cotton-filled roll 32 which is heated by contact with the steel rolls. The cotton-filled roll is situated between the two steel rolls so that the center lines of the three rolls pass through a vertical line. The bottom two rolls are free to move vertically, and the movement is restrained by hand-actuated hydraulic cylinders (not shown) under the bearings (not shown) of the bottom roll.

The calender arrangement of FIG. 4 can be used for thermally integrating the sheet produced in the process as described with respect to FIG. 1. Thus, the sheet 33 is passed directly through the nip of the two heated calender rolls 30 and 32.

The above calendering procedures are by no means critical. The calendering of the sheets may be carried out under varying conditions. One preferred way is to pass the sheet into the nip between two steel rolls or a steel roll and a composition roll. The steel roll is heated as by condensing steam to the desired temperatures. Steel rolls of one or two foot diameter and at temperatures of about 140° C. for example, can be used with suitable results. If desired, the steel roll may have a fabric-like or other type of pattern engraved therein to impart an embossed surface to the sheet. The composition roll can be such as are used in the paper industry and which are made from cotton linters, corn husks or similar materials. Their sizes are not critical. Composition rolls of one or two foot diameter or more, for example, can be used for satisfactory results.

The sheet can be fed to the calender in various ways. For example, it may be fed directly to the nip, or it may first contact one of the rolls and stay in contact with it over half of the roll's surface before entering the nip. Alternatively it may first enter the nip and stay in contact with it over half of the roll's surface after leaving the nip. The speed of passage through the calender may also vary greatly. Thus, 25 to 80 ft. per minute speeds are not uncommon. Tension may be applied to the sheet between the nip and the windup to achieve stretching if desired. Thus, stretching of up to 5% or more may be accomplished in this manner.

Calender pressures are not critical. Pressures of between 200 and 3,500 lbs./in. have been found to give good results.

FIG. 5 illustrates an arrangement of the strand material 50 in a predetermined, repetitive type of pattern which in one dimension traverses the entire width of the sheet structure. The sheet product is obtained by laying a continuous strand of fibrillated, plexifilamentary yarn on a board in such a way that successive yarns are in contact with and overlap each other. The process is repeated in a direction 90° to the first yarn lay-down. The assembly is consolidated by cold-pressing between flat plates. The non-felted nature of this arrangement is readily demonstrable by the fact that the plexifilament material can be removed (backwound) with little tearing from the sheet.

The pattern in FIG. 6 involves smaller repetitive arrangements occurring randomly across the sheet structure so as to produce a statistically uniform overall sheet configuration. Within any localized area in the sheet such as one square inch, the strand material may be arranged in an overlapping, multidirectional, intersecting pattern with the fibrous material of one layer contacting but being essentially non-entangled, or non-felted with the material of above or underneath layers. Of course, if desired, entangling or felting procedures may be performed on the sheets.

Thus, as illustrated the sheet may consist of a multitude of discrete plexifilament strands or a single continuous plexifilament strand arranged in a suitably uniform pattern or as in the preferred embodiment, a single continuous plexifilament strand is spread out or expanded laterally to a width greater than the width of the strand as freshly formed at the orifice.

FIGURES 7a, b, and c represent transverse or cross sections of fibrous elements 60 of the sheet structures of the present invention under magnification. They illustrate the ribbon-like nature of the polymeric material of the fibrous element and the fact that the cross section varies irregularly along the length of each element. The elements may be obtained by tearing a sheet structure of the invention. The fibrous elements which tend to bridge the torn gap are then separated from the remainder of the sheet structure. Consecutive transverse cuts are made in the same vicinity and the sections mounted and examined under 450× magnification. The figures represent schematically an enlargement of the field of view of the microscope.

Thus, in accordance with the present invention, the strands are first assembled into the form of a loose sheet or batt wherein the fibrous plexifilament elements are laid one on top of the other in overlapping, multidirectional, intersecting patterns without appreciable entangling or felting of fibrous elements between the layers. The response to pressure and low resiliency of these sheets is illustrated in the table below. The sheet undergoes a 10-fold reduction in thickness at 2 p.s.i. at which pressure a permanent set is developing as indicated by the low recovery.

COMPRESSION AND RECOVERY OF UNCONSOLIDATED LINEAR POLYETHYLENE SHEETS

| Pressure, p.s.i. | Percent Initial Thickness | |
|---|---|---|
| | Under load | Released |
| 0 | 100 | -------- |
| .005 | 83 | 96 |
| .017 | 62 | 76 |
| 0.55 | 48 | 62 |
| .220 | 30 | 38 |
| .440 | 23 | 32 |
| .660 | 20 | 30 |
| .880 | 18 | 24 |
| 1.22 | 16 | 19 |
| 1.55 | 12 | 13 |
| 2.11 | 10.4 | 10.5 |

The sheet or batt may be prepared by hand or mechanically. In an especially preferred direct lay-down process shown in FIG. 3, a continuous, highly fibrillated plexifilament strand which has been spread out to a width 20 times greater than the diameter of the strand prior to striking the deflector, is spun directly on to a moving belt without any intervening hold-up of the stand between spinneret and the moving belt. The continuous plexifilament strand may of course be cut into suitable lengths at a time prior to laydown on the moving belt.

The loose batt product may be treated in several ways. It may be compacted in a direction normal to the plane of the batt by means of coacting, compressive plates or rollers. If the pressure is uniformly applied, the compaction is controlled to produce a bulk density greater than 7 lb./cu. ft. at which level of densification, consolidation occurs, i.e., a coherent compacted sheet structure having a tensile strength greater than 0.3 lb./in.//oz./sq. yd. is produced. There can be removed or backwound from such coherent flexible sheets formed at low or moderate compaction pressures, i.e., below about 2 lbs./in. roll pressure, an integral network of fibrous elements having a surface area greater than 2 m.$^2$/gm. Preferably, the integral network has a tenacity greater than 0.5 g.p.d. The individual fibrous elements or film-fibrils in the network consist of filmy material having an average thickness below 4 microns.

The loose batt product, however, may be cohered by being placed in a circulating hot air oven either with or without prior gentle compaction to effect sufficient fusion to at least render the sheet coherent. With linear polyethylene, treating temperatures generally in the range of about 125–135° C. have been used with good results. The air-fused sheet is relatively porous, absorbent, drapable, opaque and bulky as compared with the calendered sheet described below.

The loose batt product may, subsequent to or coincident with a step of relatively high vertical compaction, be thermally treated at temperatures similar to air-fusion so as to form a high-strength, cohesively-bonded, integral sheet. The resulting calendered sheet may be characterized as being a fibrous structure, the fibrous elements being discernible upon working or tearing the sheet. In the extreme case of a thin, highly fused sheet, the surfaces may show evidence of fusing.

The sheet products produced in accordance with the invention under relatively light or moderate pressure are more flexible and supple than cellulosic papers of equal basis weight. It is quite surprising that a mere gentle compaction can produce a usefully strong sheet from a strengthless batt. It is possible that consolidation may be attributed to Van der Waals or analogous weak attractive forces which accrue at most contacting surfaces and which although of insignificant magnitude per small unit of contacting surface, additively yield a formidable over-all attractive force throughout the sheet in view of the enormous contacting surface area within the plexifilament sheet. These sheets may be referred to as "contact-bonded" sheets as distinguished from heat-fused sheets formed with or without pressure and referred to as "cohesively-bonded" sheets.

The contact-bonded sheets are opaque, and cold-embossable. For purposes of this invention, cold embossability might be defined as the ability of a sheet to retain the shape of the surface of a coin impressed on the sheet with a given pressure. Using the "head" side of a U.S. 25 cent piece, the cold inscription becomes legible on the unconsolidated sheet (1 lb./ft.$^3$) at a pressure of 10 lbs. and on the consolidated sheet (15 lbs./ft.$^3$) at 45 lbs. This characteristic of the sheet structure is generally useful in the storage and retrieval of mechanical impulse data under conditions where heat embossing is impractical, e.g., high speed data processing tapes wherein the data is fed into the tape by means of a striking device which forms characteristic indentations on the tape and read-out means are employed which can detect variations in the size, shape and spacing of the indentations on the tape.

The contact-bonded type of sheet of this invention has high wet strength and may be utilized as a filter in the filtration of liquid or gaseous media. In view of their extremely high internal surface area, the sheets are eminently suited as toweling for wiping up oily or hydrophobic substances, and as dust cloths for the removal of dust from metallic objects, wooden furniture, phonograph discs, photographic film and other articles. The sheets may be treated to modify the as-formed, nascent surface of the plexifilament material. Nascent or treated sheets are useful as selective adsorbents in chemical separations such as gas or liquid chromatographic analyses, as carriers or transfer agents for an adsorbed chemical species, or in other applications where a chemical or physical characteristic nontypical of the polymer from which the plexifilament is made is desired. Mere treatment of the nascent sheets with water appreciably alters the properties of the sheets, making them less electrostatic and less useful as dust cloths. When employed as dust cloths or in any other applications involving surface-abrading forces, the sheets may be quilted by a pattern of strongly bonded areas to prevent removal of surface-lying strand material. The contact-bonded sheets may also be utilized as reinforcing strata for plastic laminates, and in any applications requiring an extremely highly electrostatic sheet structure.

The bonding sites of cohesively-bonded sheets may be in the neighborhood of contacting points between separate fibrous elements where they cross or the bonding may occur at contacting points between parallel fibrous elements. The cohesive bonding involves the fastening of one fibrous element to another by means of a bridge which is identical in composition with the composition of the bonded fibrous elements and which may be as small as one molecule in thickness in which case the polymer molecule extends between the two contacting fibrous elements. The cohesive bonding is generally brought about by causing thermal plasticization of contiguous or contacting fibrous elements under such conditions that the polymer masses unite to form a bridge between the fibrous elements consisting of a homogeneous composition of matter extending from one fibrous element to the other with no intervening interfaces. The presence of cohesive bonds in a sheet may be indicated by the response of the sheet properties to the action of a wetting solvent. A sheet containing cohesive bonds has greater resistance to weakening of bonds by a wetting solvent than a contact-bonded sheet. In certain instances, the sheet product may appear to have a fused surface. This is true for example where the sheet has been consolidated by high pressured hard rolls with or without heat. In the latter case some surface fusion which results from cohesive bonding has undoubtedly taken place, however, the fibrous nature of the sheet will be obvious by mere inspection or upon working the sheet.

The cohesively-bonded sheets retain a flexibility generally equivalent to cellulosic papers of equal basis weight. They can be prepared having a tear strength and elongation greater than that of cellulosic papers in general, i.e., an Elmendorf tear strength greater than 0.3 lb.//oz./yd.$^2$, and an elongation greater than 10%. The tear strength is determined on an Elmendorf machine in accordance with TAPPI Test T 414 m49. Cohesively bonded sheets may have tensile strengths greater than 10 lb./in.//oz./yd.$^2$ and are eminently suited as protective covering material in heavy duty application where high strength is required and where it is necessary that the protective covering material be fastenable by stapling, stitching or heat-sealing. In particular such sheets find utility as bagging materials, tarpaulins, drainage ditch liners, moisture barriers for poured concrete, high-strength belting, and in laminates with other flexible and non-flexible sheet structures, weather barriers, high-strength tapes, typewriter ribbons, protective clothing, and other applications. The cohesively-bonded sheets are less cold-embossable and press-clearable than the contact-bonded sheets.

The contact-bonded sheets of the invention are pressure-clearable; that is, pressures which provide a bulk density greater than about 35 lbs./ft.$^3$ cause translucence.

This pressure is about 5,000 p.s.i. The pressure-cleared contact-bonded sheets are still fibrous in nature as may be shown by reworking the cleared portions, for example by wrinkling and stretching the sheet manually. The reworked areas regain the bulk and opaque characteristics of the original sheet. The cohesively-bonded sheets are less cold embossable and more difficult to pressure-clear than the contact-bonded sheets. The pressure-clearable feature of the sheet may be utilized in decorative applications or photo-reproduction processes where the partially cleared sheet may be utilized as a negative in the production of conventional photographic prints, said negative being prepared by embossing a uniformly opaque sheet of the present invention with the object which it is desired to reproduce.

The sheets of the invention may be prepared either from one single species of plexifilament or from mixtures of different types of plexifilament strands or from mixtures of plexifilament material with other fibrous material. The sheets may be impregnated or coated with material commonly employed for the impregnation or coating of textile, paper or other sheet structures. The sheets may be laminated to other similar sheets or other flexible sheet structures and may be embossed or quilted for decorative effects or fabric-like drapability.

The following examples are merely illustrative of the present invention and are not intended to limit it in any way.

*Example I*

A continuous strand of a fibrillated linear polyethylene plexifilamentary yarn of 500 denier, 4 m.$^2$/gm. surface area and 2.5 g.p.d. tenacity was wound on a spool. The yarn was then wrapped around a double thickness of 14 inch by 14 inch heavy pasteboard sheet in such a way that each successive turn of yarn was in contact with the previous turn. The wrapping process was repeated in a direction 90° to the first wrap so that the pasteboard was covered with two cross-hatches of yarn per side. This assembly was then consolidated by cold-pressing at 600 p.s.i. between coacting flat plates for one minute. After consolidation, the pasteboard and plexifilament sheets were separated by cutting the yarn between the edges of the pasteboard layers. The sheets thus produced had a bulk density of 32 lbs./ft.$^3$, a basis weight of 0.6 oz./yd.$^2$ and a tensile strength of 6 lbs./in.//oz./yd.$^2$ measured on an Instron tester with 5″ clamp separation and 2″ per minute cross head speed. The sheets were useful as dust cloths and oil absorbent toweling.

Two sheets formed as above were superimposed to give four layers of straight yarns oriented in alternating directions. This composite structure was pressed as above but employing plate temperatures of 132° C. The cohesively integral sheet thus formed was not cold-embossable or pressure-clearable, but remained flexible and opaque and had the following properties:

Basis weight _____ 1.2 oz./sq. yd.
Tensile strength _____ 22 lbs./in.//oz./sq. yd.
Elongation at break _____ 49%.

Work-to-break (the area under the stress strain curve) _____ 7.2 $\frac{\text{in.} \times \text{lb.}}{\text{in.} \times \frac{\text{oz.}}{\text{yd.}^2}}$ Elmendorf tear strength (measured on an Elmendorf tear testing machine) _____ 0.9 lb.//oz./yd.$^2$.

The cohesively integral sheet was isotropic in nature, i.e., had essentially equal properties in all directions, and is eminently suited for the preparation of high strength bags for shipping dry concrete aggregate premixtures and analogous materials. Shipping bags suitable for these heavy duty applications can be sealed satisfactorily by adhesives, stapling, stitching and heat-sealing.

*Example II*

Employing the apparatus of FIG. 1, a 50-gallon autoclave 1 was charged with 293 pounds of dry methylene chloride, 35 pounds of linear polyethylene cubes (melt index=1.5) and 15.9 grams of Santowhite (antioxidant consisting of a dialkyl phenol sulfide). The mixture was heated to 215° C. with agitation, and nitrogen gas was added to the autoclave to bring the total pressure to 1100 p.s.i. When equilibrium conditions of temperature and pressure had been established, the agitator was stopped and the discharge valve opened allowing the solution to pass to a spinneret consisting of four .015 inch diameter holes located 3 feet above a moving belt.

The highly fibrillated product issuing from the spinneret is allowed to impinge on the V-shaped oscillating trough. The trough is 2 inches deep and tapered in width from 3½ to 7 inches over a distance of 20 inches. The trough is attached to the horizontal shaft at a point on the underside 4 inches from the large end and inclined 45° from the axis of the trough with the large end pointing down. This assembly is coated with "Teflon" and mounted under the spinneret through a "Teflon" bushing on the horizontal shaft. The horizontal shaft is positioned so that the point of intersection between the shaft and trough is about 8 inches directly below the spinneret. The plexifilamentary strand impinging on the trough at this point is deflected 45° toward the upstream end of the belt. During spinning the shaft is oscillated through a 15° angle of rotation at 500 cycles per minute and the collection belt is run at 10 ft./min. The belt consists of a 20-mesh wire forming a continuous band. The batt was compressed by a 10 lb./in. compression roll and collected on the windup roll. The product thus formed has a bulk density of 11 lb./ft.$^3$ and a tensile strength of 0.5 lb./in.//oz./yd.$^2$. It is opaque, pressure-clearable, cold-embossable, and is useful as a porous unsupported aerosol filter. A sample of the consolidated contact-bonded sheet was hot-pressed between coacting flat plates at 600 p.s.i. at 133° C. for 5 minutes to produce a cohesively-bonded sheet having the following properties:

Tensile strength _____ 10 lbs./in.//oz./sq.yd.
Elongation _____ 15%

Work-to-break _____ 1.0 $\frac{\text{in.} \times \text{lb.}}{\text{in.} \times \frac{\text{oz.}}{\text{yd.}^2}}$ Elmendorf tear strength _____ .4 lb.//oz./yd.$^2$ The integral, cohesively-bonded sheet of this example was found to perform remarkably well as an underlayment for an asphalt coated roof.

*Example III*

Example II was duplicated insofar as the autoclave, belt collection system, solution composition, and spinning temperature and pressure are concerned. The trough device is eliminated however. To perform the spreading and randomizing action as in Example II, the spinneret device of FIG. 2 is employed. In the spinning process, the solution passes through a .075 inch diameter orifice 20, then through a 1/32 inch spinneret hole 21, impinging on a deflector 22. The deflector is so positioned that the spinneret orifice center lies 9/64 inch above the center of radius of the ¼ inch deflector arc. The highly fibrillated plexifilament yarn is deflected and spread by the deflector which is oscillated through a 15° angle at 500 cycles per minute via the shaft during spinning. The resulting web is consolidated by the compression roll operating at a force of 10 lbs./in., and the consolidated sheet is collected at the windup roll at a belt speed of 15 ft./min. The 1.7 oz./yd.$^2$ sheet thus produced was subsequently thermally integrated using the calender of FIG. 4 by passing it directly through the nip formed by the two heated calender rolls. Various calendering conditions were employed to achieve different degrees of cohesive bonding to produce products with varying combinations of properties, as indicated by the results shown in Table I.

TABLE I

| Calender Conditions | Sample | | | |
|---|---|---|---|---|
| | 1 | 2 | 3 | 4 |
| Roll Temperature, °C | 135 | 135 | 136.5 | 136.5 |
| Roll pressure, lb./in. | 118 | 118 | 300 | 118 |
| Speed, ft./min | 2 | 9 | 26 | 3 |
| Properties: | | | | |
| Tensile, lb./in.//oz./yd.$^2$ | 12.1 | 18 | 15 | 19 |
| Elongation, percent | 26 | 35 | 33 | 42 |
| Work-to-break, $\frac{in.\times lb.}{in.\times \frac{oz.}{yd.^2}}$ | 2.1 | 3.9 | 3.0 | 4.9 |
| Elmendorf tear, lb.//oz./yd.$^2$ | .8 | .5 | 1.0 | .5 |
| Moisture Vap. Trans., g./m.$^2$/24 hr | 6.9 | 59 | 1.2 | 9.3 |

*Example IV*

Employing the apparatus of FIG. 3, the autoclave is charged with 293 lbs. of dry methylene chloride (refrigerant grade as specified in Du Pont Electrochemicals Department Bulletin S-7-355), 35 lbs. of linear polyethylene having a density of 0.959, melt index 1.4 and containing 39 p.p.m. of Santowhite, and 14.3 grams of Santowhite to obtain an over-all antioxidant concentration of 1,000 p.p.m. This mixture is heated and agitated for approximately 2½ hours to obtain a solution temperature of 214° C. at an autogeneous pressure of 660 p.s.i. Nitrogen is then added over the solution from the pressure tank and mxied into the solution to obtain an equilibrium pressure of 730 p.s.i. Agitation is then stopped and nitrogen is added to bring the total pressure to 800 p.s.i. at a solution temperature of 217° C. The solution is then passed through the transfer line, through the filter, through a .035 inch preflash orifice at 800 p.s.i., 217° C. and through the dual spinnerets, each constructed in accordance with FIG. 2 and having a 31 mil diameter and 31 mil length. The yarn is thereby spread as it moves along the deflector into a wide bell-shaped web.

Approximately 3 inches below the spinneret and one inch from the spinning web, the yarn passes through a 45 kv. electrostatic field induced through the bar. The field serves to increase filament separation and improve pinning of the web to the endless neoprene belt, located 26 inches below the spinneret and moving at 15 feet per minute. The ground plate located immediately under the neoprene belt guides the yarn by attraction during the deposit. The web is traversed in the cross-belt direction at 500 cycles/minute by a 22° included angle of oscillation of the deflector. This traversing action enhances a natural tendency of the yarn to deposit randomly on the belt.

The deposited yarn is then removed from the lay-down area by the moving belt, passes under the static dissipator located over the belt and through a pressure roll which consolidates the sheet. A series of consolidated sheets were made using various pressures of the pressure roll. The conditions of roll pressure and properties of the contact-bonded consolidated sheet products produced are shown in Table II.

TABLE II

| Roll Pressure, lbs./in. | Density, lbs./cu. ft. | Tensile Strength, lbs./in.//oz./yd.$^2$ |
|---|---|---|
| 1.0 | 7.0 | 0.3 |
| 1.4 | 8.5 | 0.5 |
| 2.0 | | 0.5 |
| 3.5 | 14.5 | 0.95 |
| 7.0 | 14.5 | 0.95 |
| 10.0 | 15.2 | 1.0 |
| 12 | | 1.4 |
| 80.0 | | 1.7 |

Some plexifilamentary yarn removed during the preparation of the above batt was found to have the following properties.

| | |
|---|---|
| Melt index | 1.5. |
| Tenacity as-spun (undrawn) | 0.7 gs./denier. |
| Surface area | 16.7 m.$^2$/g. |
| X-ray orientation angle | 40°. |

The above-produced sheet, consolidated by contact-bonding, and having a tensile strength of 1.0 lb./in.//oz./yd.$^2$, was subjected to calendering on a calender as shown in FIG. 4. It consisted of a frame containing two 10-inch diameter, 34-inch long stainless steel rolls which are internally heated by steam and a 12-inch diameter cotton filled roll which is heated by contact with the steel rolls. The roll speed is set for 50 ft./min., the pressure adjusted to 5,000 pounds on each end of the bottom roll and the steel roll surface temperature brought to 140° C. At these settings, a 24-inch consolidated, contact-bonded plexifilamentary sheet is passed directly through the nip formed by the top steel and the cotton filled roll. The sheet is then picked off the rolls at the discharge side of the nip and wound up at constant tension at 48 ft./min. The cohesively bonded sheet prepared in this fashion is opaque and flexible but no longer cold-embossable. The sheet has the following properties:

| | |
|---|---|
| Basis weight | 2.2 oz./yd.$^2$. |
| Instron tensile strength | 14 lbs./in//oz./yd.$^2$. |
| Elmendorf tear strength | 0.92 lb.//oz./yd$^2$. |
| Tear propagation | 1.9 lbs.//oz./yd.$^2$. |
| Elongation | 40%. |
| Work-to-break | $4.0 \frac{in.\times lb.}{in.\times \frac{oz.}{yd.^2}}$ |
| Tappi M.V.T. | 10 gs./m.$^2$/24 hrs. |

The utility of the cohesively-bonded sheet of this example is best illustrated by comparison of its performance with currently used films. For this purpose, a one inch wide strip of the material to be tested was stapled to heavy pasteboard with a single Hansen No. 43 (³⁄₁₆″) staple with the staple arranged across one end of the 1″ sample strip and the strip extending beyond the edge of the pasteboard. This assembly is placed in an Instron Tensile Tester so that the pasteboard is in one jaw and the strip in the other (upper). The applied force pulls the strip away from the staple while the pasteboard and sample are parallel. The force required to produce a visible rupture in the sample due to the staple, and the force required to separate the pasteboard and sample are recorded.

The cohesively integral sheet of this example requires 3 times the tension required of polyethylene film of equal basis weight to produce an initial rupture at the staple, and 5 times the tension to pull free of the staple once damaged. The plexifilamentary cohesively integral sheet will not creep detectably under a load which breaks a film of the same polymer of equal basis weight. Its tensile and Elmendorf tear strengths are about 5 times those of an equal weight of unoriented linear polyethylene film. Unlike film of the same polymer, the cohesively-bonded sheets of this invention give strong seams when stitched together. In addition, they may be heat-sealed. The strength of the seal (10 lbs./in.$^2$) is equal to that of the film. This feature allows formation of a strong flexible, impermeable seam in the field. Unlike woven or nonwovens of the prior art, the cohesively integral plexifilament sheet possesses impermeability comparable to polyethylene film in its resistance to moisture transmission even without coating or impregnating.

Example V

A contact-bonded plexifilamentary sheet is prepared by the procedure of Example IV except that a belt speed of 10 ft./min. was used giving a sheet having a basis weight of 3.2 oz./sq. yd. and the consolidation rolls were set for 18 lbs./in. The consolidated, contact-bonded sheet thus produced has a density of 15 lbs./ft.$^3$ and a tensile strength of 1 lb./in.//oz./yd.$^2$. A portion of this sheet is placed in a circulating air oven at 128° C. for 2 minutes during which time a linear shrinkage of 15% occurs. The hot air bonded sheet has the following properties:

Basis weight _____ 4.7 oz./yd.$^2$.
Tensile strength _____ 6.3 lbs./in. // oz./yd.$^2$.
Elongation _____ 32%.
Elmendorf tear strength _____ 1.3 lbs.//oz./yd.$^2$.

The air-fused sheet is more porous, absorbent, drapable, opaque, and bulky than calendered, cohesively-bonded sheets of the same basis weight. The tear strength and toughness of the air-fused, cohesively-bonded sheet are more than adequate for stitching, stapling and the usual textile finishing operations. Its bulk and drapability make it a suitable candidate for a low cost, rot-resistant, dimensionally-stable carpet backing.

Example VI

A contact-bonded sheet having a bisis weight of 4 oz./yd.$^2$ having been prepared by the method of Example IV, is pressed at 600 p.s.i. in a platen press in contact with a piece of 15-mesh copper screen. The resulting cold-bossed sheet has a tensile strength of 2.4 lbs./in.//oz./yd.$^2$ and a Clark rigidity factor of 3, as measured by the procedure described in TAPPI standard methods T 451—M—45.

The sheet is highly absorbent and flexible, and possesses more than an adequate strength for use as a dry or wet pipe for household or industrial uses. The sheet is remarkably efficient as a dust cloth.

A sample of the cold-embossed, contact-bonded sheet is then held for two minutes in an air oven at 130° C. The air-fused sheet thus obtained has a tensile strength of 6.2 lbs./in.//oz./yd.$^2$ and a Clark stiffness factor of 6. Another sample of the cold-embossed, contact-bonded sheet of this example was pressed on flat platens for two minutes at 130° C. to yield a cohesively-bonded sheet having a Clark stiffness factor of 20. The above results are summarized in Table III.

TABLE III

| Treatment | Clark Factor | Tensile Strength |
|---|---|---|
| Consolidated | | 1.0 |
| Consolidated, cold-embossed | 3 | 2.4 |
| Consolidated, cold-embossed, air-fused | 6 | 6.2 |
| Consolidated, cold-embossed, hot-pressed | 20 | 10.1 |

The products having the Clark stiffness factor of 3 are well suited as dust cloths. The products having a Clark stiffness factor of about 6 have adequate appearance, flexibility, opacity and strength suitable for use in window shades and lamp shades.

The following example illustrates the preparation of a thicker and inflexible consolidated sheet. For the purposes of the present invention and inflexible sheet may be described as one having a bending moment greater than 0.1 inch-lbs. with the bending moment measured and defined in the following manner: The sheet sample is placed in the Tinius-Olsen Stiffness Tester as described in ASTM D–747–58T. Using a sample span of 0.5 in., the procedure described in the method is used. The bending moment of this specification is calculated by using the equation for modulus of elasticity but omitting the term describing sheet thickness ($d^3$). As stated in the method the load and angle at 30° deflection are used in the calculation.

Example VII

Layers of low density contact-bonded sheets as produced in Example V were compressed between hot platens. A 32 oz./yd.$^2$ sheet of a linear polyethylene was pressed at 30 p.s.i. and 136° C. to a thickness of 700 mils. This sheet had a tensile strength more than twice that of cast linear polyethylene and a bending modulus (Tinius-Olsen) of 715,000 p.s.i. and had a bending moment gerater than 0.1 in.-lbs.

The consolidated flexible sheets of this invention, whether cohesively integrated or not, may be prepared in isotropic or non-isotropic modifications. By appropriate selection of polymer, sheets of the present invention may also be prepared having a propensity to shrink at least 20% when subjected to temperatures between the second order transition temperature of the polymer and its melting point, while the sheet is in an unrestrained configuration. The contact-bonded sheets generally produce greater contractions than the cohesively-bonded sheets. This shrinkage characteristic affords the valuable ability of closely conforming by means of thermal treatment to the contour of a packaged article during a packing operation.

Example VIII

In this example the apparatus used is identical to that illustrated in FIGURE 3 except that one spinneret is located in a position directly over the center of the moving belt. The clave is charged with 293 lbs. of dry methylene chloride and 35 lbs. of a polymer mixture which consists of 70 parts of linear polyethylene and 30 parts of polyisobutylene ("Vistanex L100" Enjay Chemical Co.). This mixture is heated and agitated for approximately 2½ hours to obtain a solution temperature of 205° C. at autogenous pressure. Nitrogen is then added over the solution pressure tank and mixed into the solution to obtain an equilibrium pressure of 900 p.s.i. Agitation is then stopped and nitrogen is added to bring the total pressure to 950 p.s.i. and a solution temperature of 205° C. The web is then spun into a sheet as described in the Example IV.

The resulting 4 oz. sheet had a tensile of $$1.8 \text{ lbs./in.//oz./yd.}^2$$

an elongation of 49% and an Elmendorf tear strength of .6 lb.//oz./yd.$^2$ The sheet is characterized by its high toughness in the unfused state and by its drape or fabric-like hand. The elastomer provides a soft surface of well secured filaments. This material was found to be useful as a wipe for surfaces subject to abrasion by dust such as glass and auto finishes. The softness and hand of the sheet are not unlike that of chamois skin.

Example IX

Employing the apparatus of FIGURE 3 as modified in the Example VIII, the autoclave is charged with 300 lbs. of dry methylene chloride and 31 lbs. of polypropylene melt index 0.17 (Avisun-1011). This mixture is heated and agitated for approximaely 2½ hours. Agitation is discontinued and nitrogen added to 800 p.s.i. at a solution temperature of 215° C. Spinning is started at these conditions and the web spun into sheet in the manner described in Example IV. The pressure roll-consolidated sheet has a tensile strength >0.3 lbs./in.//oz./yd.$^2$ A strand of yarn removed from this sheet has an as-spun tenacity of 0.53 g./d. and an X-ray orientation angle of 50°. A portion of this material is hot pressed between coating flat plates at 600 p.s.i. at 157° C. for five minutes to produce a cohesively-bonded sheet having high elongation and high tensile and tear strengths.

The contact bonded material is found to be useful as an unsupported filter in high temperature aerosol systems while the cohesively-bonded sheet performs well as a gasket in a steam line.

*Example X*

A 300 ml. autoclave is charged with 90 g. of dry methylene chloride, 20 g. of Du Pont Freon 114 and 90 g. of polyethylene terephthalate (relative viscosity 5% formal: 0.49). The mixture was agitated and brought to a temperature of 205° C. at a pressure of 840 p.s.i. maintained by nitrogen over the solution. After brief spinning of discontinuous ragged yarn, a fibrillated yarn formed which had a tenacity of 0.7 gram per denier as-spun. This yarn is wrapped on pasteboard to form a sheet as described in Example I. As compacted on a flat press at 600 p.s.i., the sheet has a tensile strength of >0.3 lb./in.//oz./yd.². A portion of this 2 oz./yd.² material is pressed at 300 p.s.i. and 235° C. between coacting flat platens to give a sheet with a high tensile strength. This material is found to be useful as a backing for coated abrasive papers.

*Example XI*

A 15.7% solution in methylene chloride of "Delrin" acetal resin (poly[oxymethylene]), of 46,500 molecular weight, marketed by Du Pont, is heated to 200° C. in an autoclave. With the solution at autogenous pressure, a Hoke valve No. 327 is opened permitting discharge of solution into the atmosphere through a 75 mil diameter, 75 mil long orifice. A continuous, highly-fibrillated plexifilament is obtained. This highly fibrillated yarn is wrapped on pasteboard to form a sheet as described in Example I and compacted between flat platens. The sheet obtained had a tensile strength greater than 0.3 lb./in.//oz./yd.². The hand-laid sheet may be calendered to form a high tensile strength sheet.

*Example XII*

The fibrillated "Delrin" of Example XI may be replaced with fibrillated polyacrylonitrile plexifilamentary strand to achieve like results.

*Example XIII*

Fibrillated poly(hexamethylene adipamide) filamentary strand material was substituted for the fibrillated "Delrin" of Example XII in the preparation of the hand-laid sheets. The resultant sheet product after compaction had a tensile strength which exceeded 0.3 lb./in.//oz./yd.².

*Example XIV*

Employing an apparatus similar to that of FIGURE 1, a 50-gallon autoclave was charged with 277 pounds of dry methylene chloride, 35 pounds of linear polyethylene cube (melt index=1.5) and 15.9 grams of Santowhite antioxidant (dialkyl phenol sulfide). The mixture was agitated and heated to a temperature such that when agitation was stopped and nitrogen added to attain a pressure of 750 p.s.i., the solution temperature was 212° C. This solution was spun through a single .015 x .015" spinneret in the manner described in Example II using a belt speed of 2.5 feet per minute.

The resulting single-strand sheet was light (1.2 oz./yd.²) and porous. Two sheets plied together were pressed between co-acting platens at 134° C. to form a sheet with the following properties:

Basis wt. (oz./yd.²) _____ 2.5
Tensile (lb./in.//oz./yd.²) _____ 9.3
Elongation (percent) _____ 24
Tear strength (lb.//oz./yd.²) _____ 0.5

*Example XV*

A sample of the yarn of Example XIV was backwound from a batt collected below the spinneret. A 51 denier sample of the yarn had a tenacity of 0.86 gram per denier and yielded filmy material of thickness below 4 microns. The strand was not fibrillated but corresponded to the description of tunneled plexifilament.

A sheet was prepared from this strand by the handwinding process described in Example I except that adjacent strands were not in contact. The resulting, lightweight open mesh sheet was pressed between co-acting platens at 132° C. to give a flexible sheet with the following properties:

Basis weight (oz./yd.²) _____ 0.8
Tensile (lb./in.//oz./yd.²) _____ 7.8
Elongation (percent) _____ 47
Tear (lb.//oz./yd.²) _____ 2.2

This sheet material comprising high-denier elements relative to the sheets prepared from fibrillated yarns possesses high porosity at low basis weight and is useful as a material for light-weight breathable bagging for fresh fruit and vegetables.

*Example XVI*

The apparatus used is identical to that illustrated in FIGURE 3 except that one spinneret is located in a position directly over the center of the moving belt. The autoclave is charged with 293 pounds of methylene chloride, 10.5 pounds of cellulose acetate, and 24.5 pounds of linear polyethylene of melt index 1.5. This mixture is heated and agitated for approximately 2½ hours to obtain a solution temperature of 216° C. at a pressure of 710 pounds/sq. in. The solution is then spun to form a batt as described in Example VIII. The batt is pressed on coacting platens at 128° C. to give a sheet of basis weight 2.5 oz./yd.². The properties of this sheet are as follows:

Tensile strength lbs./in.//oz./yd.² _____ 6.4
Tear strength lbs.//oz./yd.² _____ 0.6
Moisture vapor transmission g./m.²/24 hrs. _____ 60

This sheet, unlike 100% polyethylene sheets, is receptive to dyes. Under standard conditions, the dyes Acetyl Amine Scarlet B and Latyl Brilliant Blue were applied with satisfactory effectiveness to these sheets.

*Example XVII*

A 2 gallon autoclave equipped with an agitator and an inlet for pressurized gas was charged with 2666 grams of dried methylene chloride, 217 grams of linear polyethylene (melt index 1.5) and 73 grams of "hypalon" 30 (chlorosulfonated polyethylene). The mixture was agitated and brought to a temperature of 215° C. under a pressure of 800 p.s.i. maintained by nitrogen. The solution was allowed to emerge through a 0.050 inch x .050 inch spinneret and the resulting yarn collected in a wire basket. This yarn was wound into a 10 x 10 inch sheet by the method described in Example I. The sheet was pressed between coacting platens at 128° C. The pressed, 1.7 oz./yd.², sheet had a tensile strength of 10.6 lbs./in.//oz./yd.², a tear strength of 0.9 lb.//oz./yd.² and an elongation of 48%. This sheet exhibited a drape comparable to woven fabric. The Clark rigidity factor was 2.7.

*Examples XVIII through XXVI*

Other fibrous sheets of polymer compositions containing linear polyethylene (LPE) were prepared by the procedure of Example XVII. The polymer mixtures and their properties are indicated in the following tables (all examples 2,666 grams methylene chloride, .050 x .050 inch spinneret).

TABLE III

| Polymer Mixture | | Grams LPE | Grams of other material | Property |
|---|---|---|---|---|
| XVIII | LPE; ethylene/vinyl alcohol. | 334 | 116 | Dye receptivity. |
| XIX | LPE; "Zytel" | 261 | 29 | Do. |
| XX | LPE; "Aerosol" OT (American Cyanamid). | 2.90 | 15 | Do. |
| XXI | LPE; polyvinyl chloride, Dow 111-4 (Dow Chem.). | 189 | 101 | Flame retardant sheet. |
| XXII | LPE; neoprene | 203 | 87 | Abrasion resistant sheet. |
| XXIII | LPE; "Saran", Dow F-220 (Dow Chem.). | 217 | 73 | Low permeability sheet. |
| XXIV | LPE; "Aroclor" 546 (Monsanto Chem.). | 203 | 87 | Flame retardant. |
| XXV | LPE; polyurethane | 441 | 49 | Elastomeric sheet. |
| XXVI | LPE; branched polyethylene, polystyrene Dow JD (Dow). | 184 | [1] 188/29 | Bulky resilient sheet. |

[1] Branched polyethylene/polystyrene.

While among the above examples there are illustrations of blends of polymers wherein the blend was spun from the same spinneret orifice, it is equally possible to prepare blended polymer sheets of two or more polymers each of which is spun from a separate spinneret orifice.

The sheet products of the invention may be coated, laminated or impregnated with a great variety of both polymeric and non-polymeric materials. Of the former variety there may be included natural waxes, dyes, pigments, etc. Typical polymeric compositions which may be employed for impregnating or coating of the fibrous sheets of this invention include polyhydrocarbons such as polyethylene, polypropylene and polyisobutylene, natural rubber, neoprene, chlorosulfonated polyethylene, GR-S, "Lecton" acrylic resin, polyvinyl chloride, and various vinyl halide and vinyl ester polymers and interpolymers. These polymeric compositions may be applied by either melt, solvent, or dispersion techniques.

Laminated structures may be prepared using in general the more dense fibrous sheet structures of this invention. Thermoplastic compositions may be applied as a layer to the sheet surface by either solvent, melt, or dispersion methods. Other methods may also be employed to form laminated structures, e.g., calendering, dipping, direct extrusion of a film onto the sheet surface, "kiss-roll" methods, needle-punching techniques, vacuum consolidation methods and others. The fibrous sheet structures of this invention may be laminated to metal foils, cellulosic or synthetic papers, isotropic or non-isotropic films of thermoplastic polymer, and other flexible planar surfaces. Various treatments may be employed to enhance the adhesion of the fibrous sheet to the other flexible member, including the use of adhesive, irradiation treatments, such as the Lepel treatments, flame treatments as generally applied to polyethylene, and analogous procedures. In general, the properties of the laminated structures reflect in part the properties of the fibrous sheet structure of this invention and the flexible material to which it has been laminated. For example, a laminate of the sheet product of the invention and biaxially oriented polyacrylonitrile film (described in French Patent 1,239,343 to Osborn) possesses high impermeability to water vapor $CO_2$ and $O_2$. Of course, multiple laminated sheet structures are also contemplated. The following examples are illustrative of the aforementioned structures.

Example XXVII

A film was extruded onto a cohesively-bonded, fibrous, linear polyethylene sheet of this invention having the properties indicated in the table below. A 0.25 mil coating of "Alathon" 15 (Du Pont) polyethylene was thus applied to the fibrous sheet using a standard 1 inch extruder at a windup speed of 4 ft./min., a chill roll temperature of 55° C., a barb pressure of 50 lbs., a melt temperature of 310° C., and a lip opening of .006 inch. The resulting coated sheet showed decreased moisture vapor permeability with good tensile strength, tear strength and elongation as indicated in the table below:

TABLE

| Properties | Uncoated Sheet | Coated Sheet |
|---|---|---|
| Basis weight, oz./yd.$^2$ | 2.0 | 2.2 |
| Tensile, lbs./in.//oz./yd.$^2$ (MD/CD[a]) | 8.6/6.8 | 8.5/6.3 |
| Elongation, percent (MD/CD) | 26/32 | 33/20 |
| Tear, lbs.//oz./yd.$^2$ (MD/CD) | .64/.82 | .55/.72 |
| Electronic burst, lbs.//oz./yd.$^2$ | 5.3 | 4.9 |
| Moisture vapor transmission, gs./m.$^2$/24 hrs. | 480 | 15 |

[a] MD/CD=machine direction/cross direction.

In a similar manner, samples of cohesively-bonded, fibrous sheet can be coated with nylon, Saran, or other type polymers to secure composite structures having improved solvent resistance (e.g., kerosene), impact strength, dye receptivity, abrasion resistance, flame retardency, drapability, and various other properties.

Example XXVIII

A linear polyethylene sheet contact-bonded to a density of 15 lb./cu. ft. was saturated with a 50% aqueous emulsion of a copolymer of 94 parts vinylidene chloride and 6 parts methyl acrylate. The emulsion-saturated sheet had more than adequate strength for handling. The sheet was dried in a circulating air oven at 100° C. The resulting high gloss sheet consisting of approximately 45% copolymer showed a low permeability even in the highly flexible, nonheat bonded state. After pressing between coacting platens at 132° C., the sheet had the following properties:

Property—
  Basis weight oz./yd.$^2$ _____ 3.73
  Tensile lb./in.//oz./yd.$^2$ _____ 6.8
  Elmendorf tear lb.//oz./yd.$^2$ _____ .38
  Moisture vapor transmission g./m.$^2$/24 hrs. ___ 9
  Elongation, percent _____ 21

Close examination of the impregnated sheet reveals that the copolymer permeates the sheet to a considerable extent, filling the interstices between the fibrous elements within the sheet.

Example XXIX

A contact-bonded fibrous sheet prepared as described in Example IV, having a density of 15.2 lbs./cu. ft., was laminated to a sample of 1 mil oriented linear polyethylene film using coacting platens at 121° C. and 100 p.s.i. for 60 seconds. The resulting composite structure had a tear strength 7 times greater than that of the original polyethylene film. A comparison of the properties of the film, and of the composite, laminate structure are given in the following table.

TABLE

| Sample | Basis Wt., oz./yd.$^2$ | Tensile Strength, lb./in.//oz./yd.$^2$ | Elongation, Percent | Elmendorf Tear, lb.//oz./yd.$^2$ |
|---|---|---|---|---|
| LPE-film | [1] 0.73 | 3.5 | 550 | 0.13 |
| Laminate of LPE-film with fibrous sheet | 1.2 | 6.3 | 30 | 0.92 |

[1] 1 mil.

Example XXX

A contact-bonded sheet prepared in a manner similar to that described in Example IV was laminated to a 1.5 mil film of branched polyethylene resin in a press at 130° C. and 20 tons pressure for 45 seconds. The cold peel adhesion of the coating to substrate was 450 grams/inch. The Elmendorf tear strength was 1100 and 1310 grams when measured in perpendicular directions. Heat seals were made by pressing two sheets of laminate with the coated sides together in a heat sealer with a ⅝" bar at 120° C. with 10 p.s.i. and a dwell time of 1.5 seconds. The heat seal value of 1720 grams/inch was obtained.

*Example XXXI*

When the procedure of Example XXX was repeated with 0.7 mil biaxially oriented linear polyethylene film instead of the branched polyethylene film a structure was obtained having an Elmendorf tear strength of 427 and 457 grams when measured in perpendicular directions. The coated-to-coated heat seal on this product was 1930 grams/inch when sealed with a ⅛" sealer at 240° C., 10 p.s.i., 0.5 second.

*Example XXXII*

The fibrous sheet of Example XXIX was calendered with a ½ mil linear polyethylene film under the following conditions: 140° C. roll temperature, 10 ft./min. speed, 200 lbs./linear in. roll pressure. The resulting laminated structure (basis weight 2.7 oz./yd.$^2$) had a tensile strength of 10.3 lbs./in.//oz./yd.$^2$ and a tear strength of 0.5 lb.//oz./yd.$^2$. The moisture vapor transmission of the laminate was 2 grams/meter$^2$/24 hours. The moisture vapor transmission of a fibrous sheet, calendered under the same conditions but without the film was 80 grams/meter$^2$/24 hrs.

*Example XXXIII*

A 4" x 5" sample of the fibbrous sheet of Example XXVII was dipped into a 15 wt. percent solution of Saran F-242-LD (91/9 vinylidene chloride/acrylonitrile) in tetrahydrofuran, and then dried at 100° C. in a circulating air oven. The properties of the coated product (there was only slight penetration) were as follows:

| | |
|---|---|
| Unit weight (g./m.$^2$) | 89.34 |
| Area factor (in.$^2$/lb.) | 7,873 |
| Modulus (K p.s.i.), MD/TD | 168.9/156.9 |
| Percent elongation, MD/TD | 30/30 |
| Tensile (K p.s.i.), MD/TD | 5.6/5.7 |
| Electronic burst (lbs.) | 15.9 |
| Electronic burst (lbs./mil) | 3.9 |
| IPV (g. water vapor/100 m.$^2$/hr.) | 40 |
| IPV (g. water vapor/100 m.$^2$/hr./mil) | 182 |
| Kerosene permeability (g. liquid kerosene/100 m.$^2$/hr.) | 20 |

*Example XXXIV*

A calendered sheet prepared by a procedure similar to Example IV was coated with a blend of an ethylene-vinyl acetate copolymer (72/28) and a paraffin wax having a melting range of 160°–165° F. (30/70) on a "kiss-roll" coater. The "kiss-roll" rotated in the molten blend heated to 225° F. and the sheet which came in contact with the roll picked up the coating which was then metered by a scraper bar. Speed on this experimental coater varied from 7 to 20 ft./min. Slower speeds yielded thinner coatings. The sheet after being coated was also coated on the other side by the same method.

Properties of the above coated sheets are:

| | Uncoated sheet | Sheet coated on one side | Sheet coated on both sides |
|---|---|---|---|
| Basis Wt. (oz./yd.$^2$) | 1.90 | 2.91 | 3.70 |
| Tensile (lb./in.//oz./yd$^2$) | 8.7 | 5.7 | 5.7 |
| Elongation, percent | 19 | 18 | 19 |
| Work-to-break $\left(\frac{\text{in.} \times \text{lb.}}{\text{in.} \times \frac{\text{oz.}}{\text{yd.}^2}}\right)$ | 0.87 | 0.63 | 0.63 |
| Tear-Elmendorf (lb.//oz./yd.$^2$) | 0.63 | 0.50 | 0.43 |
| MVT (g./m.$^2$/24 hrs.) | 17.2 | 0.0 | 0.0 |
| MVT (g./m.$^2$/24 hrs.) after crumpling | 129.7 | 6.4 | 3.9 |
| MVT (g./m.$^2$/24 hr.) after creasing TAPPI Standards (T–465–SM52) | 33.6 | 2.2 | 1.1 |
| Abrasion resistance (cycles to failure) | 9 | 21 | 25 |

*Example XXXV*

Example XXXIV was repeated using a 40/60 polymer wax ratio. The coating variables were identical to aforementioned example.

Properties of the coated sheets are:

| | Sheet coated on one side | Sheet coated on both sides |
|---|---|---|
| Basis Wt. (oz./yd.$^2$) | 4.06 | 6.20 |
| Tensile (lb./in.//oz./yd.$^2$) | 5.4 | 4.4 |
| Elongation, percent | 21 | 24 |
| Work-to-break $\left(\frac{\text{in.} \times \text{lb.}}{\text{in.} \times \frac{\text{oz.}}{\text{yd.}^2}}\right)$ | 0.60 | 0.59 |
| Tear-Elmendorf (lb.//oz./yd.$^2$) | 0.37 | 0.34 |
| MVT (g./m.$^2$/24 hrs.) | 0.83 | 1.9 |
| MVT (g./m.$^2$/24 hrs.) after crumpling | 2.2 | 2.8 |
| MVT (g./m.$^2$/24 hrs.) after creasing (T–465–SM–52) | 1.7 | 0.6 |
| Abrasion resistance (cycles to failure) | 31 | 74 |

*Example XXXVI*

A contact bonded sheet was treated with a series of impregnants listed in the table below in a manner similar to that of Example XXVIII. The impregnants improved the moisture vapor transmission in every case. After impregnating, the sheets were fused in a hot press at 132° and 30 p.s.i. for 3 minutes. Treatment with the various impregnants, in many cases, made the sheet pliable and improved the drape. The physical properties of the impregnated sheets are included in the table along with the moisture vapor transmission data:

TABLE

| Sample coated with series of dispersions | Basis Wt., oz./yd.$^2$ | Tensile, lb./in.//oz./yd.$^2$ | Elong., percent | Elm. Tear, lb.//oz./yd.$^2$ | MVT, g./m.$^2$/24 hr. |
|---|---|---|---|---|---|
| 1. Uncoated sheet | 2.69 | 10.3 | 23 | 0.26 | 300 |
| 2. Sheet coated in an aqueous dispersion of ethylene-vinyl acetate copolymer 60-40 ratio (5% solids) | 3.50 | 8.30 | 34 | 0.27 | 107.7 |
| 3. Sheet coated in an aqueous acrylic emulsion-Rhoplex AC-200, 40% solids | 4.50 | 6.8 | 18 | 0.20 | 136.6 |
| 4. Sheet coated with a toluene-tetrahydrofuran solution of vinylidene chloride/acrylonitrile-91/9 copolymer (50% solids) | | | | | |
| 5. Sheet coated with an aqueous dispersion of hexylmethacrylate/butyl methacrylate/methacrylic acid copolymer (50% solids) | 3.82 | 8.2 | 35 | 0.30 | 96.11 |
| 6. Sheet coated with methylmethacrylate/butadiene/methacrylic acid copolymer aqueous emulsion (50% solids) | 2.96 | 5.5 | 17 | 0.70 | 5–6 |
| 7. Sheet coated with n-hexyl methacrylate/methacrylic acid-aqueous emulsion (92/8) (50% solids) | 4.20 | 7.8 | 33 | 0.31 | 14.4 |
| 8. Sheet coated with an aqueous acrylic emulsion "Rhoplex E–80" 30–40% solids | 4.05 | 10.1 | 36 | 0.19 | 29.4 |
| 9. Sheet coated with an axueous dispersion of ethylene vinyl acetate copolymer (40% solids) | | | | | |

Example XXXVII

Calendered sheet prepared by a procedure similar to that of Example IV was coated with a powdered aluminum dispersion in an organic solvent by spraying or painting so as to impart an evenly coated surface. The spray can be applied to a sheet pretreated with an adhesive or the adhesive can be mixed with the aluminum dispersion to obtain a well bonded aluminum surface on the sheet. Advantages of such a sheet are prolonged outdoor durability, aesthetics and a high surface reflectance. The properties of the aluminum coated sheet and the control are shown below:

|  | Control Sheet | Aluminum Coated Sheet |
|---|---|---|
| Basis Wt. (oz./yd.$^2$) | 2.23 | 2.57 |
| Tensile (lb./in.//oz./yd.$^2$) | 10.9 | 12.3 |
| Elongation, percent | 33 | 36 |
| Tear-Elmendorf (lb.//oz./yd.$^2$) | 0.55 | 0.48 |

Example XXXVIII

The contact-bonded or calendered sheet of this invention can be impregnated with water proofing agents by spraying or dipping the sheet into an aqueous dispersion or a solution of water proofing agent to impart improved water resistance. For example a calendered sheet was dipped in a 1% solution of a paraffin wax/poly-(N,N-diethylamino)-ethylmethacrylate copolymer mixture in toluene, air dried and pressed at 128° and 30 p.s.i. for 3 minutes. The resulting sheet did not leak water below a head of 30 cm. of water whereas the control which contained holes originally leaked water at a head of 0 to 10 cm. of water.

A unique characteristic of the sheet products of the invention is, as mentioned earlier, ready embossability. When applying vinyl resin to woven fabrics, it has in the past been necessary to build up a substantial thickness of the vinyl resin in order to achieve "deep" embossability. This is because the fabric itself will not accept the detailed embossing patterns. The use of the sheet products of the invention as the substrate in place of the woven fabrics permits one to obtain even with the thinnest vinyl resin or other embossable film coating, a product which is capable of being embossed with detailed patterns.

The following example demonstrates this property:

Example XXXIX

A pigment and plasticizer containing solution of polyvinyl chloride in methyl ethyl ketone was applied with a brush to a 8″ x 8″ piece of a cold consolidated sheet of the invention (B) and to a 6.75″ x 7″ piece of cotton cambric (A). The coating was allowed to dry at room temperature. Both of the substrates were weighed before and after coating.

|  | (A) | (B) |
|---|---|---|
| Basis weight before coating | 2.72 oz./yd.$^2$ | 1.63 oz./yd.$^2$ |
| Basis weight after coating | 5.62 oz./yd.$^2$ | 3.45 oz./yd.$^2$ |
| Basis weight of coating | 2.90 oz./yd.$^2$ | 1.82 oz./yd.$^2$ |

The coated samples were then embossed with a burlap pattern under the following conditions: 132° C., 40 tons ram pressure for 1 minute in a flat press. The embossed pieces showed clearly that the coated sample (B) had accepted the detailed pattern of the embossing plate, whereas the vinyl coated cotton sample showed only a faint embossing pattern with none of the detail evident.

Example XL

A plexifilamentary linear polyethylene sheet was cold-pressed, cohesively-bonded in hot air, and then coated with a solution of chlorosulfonated polyethylene ("Hypalon" 30). The solution contained the following ingredients:

|  | Parts |
|---|---|
| "Hypalon" 30, a chlorosulfonated polyethylene | 75 |
| "Staybelite," a hydrogenated wood rosin | 1 |
| n-Butyl alcohol | 20 |
| Toluene | 140 |
| "Tri-Mal" tribasic lead maleate | 25 |
| Titanium dioxide pigment | 80 |
| "Super Multiflex" calcium carbonate | 20 |
| "Monastral" blue pigment, BT-284-D | 0.5 |
| "Thermax" carbon black | 0.2 |
| Isopropyl alcohol | 30 |
| Xylene | 135 |
| "Solvesso" 100, a blend of aromatic solvents with medium boiling range | 50 |
| "Carbowax" 4,000, a paraffin wax | 2 |
| "Arachlor" 5460, a chlorinated biphenyl/biphenyl ether mixture | 20 |
| 2-benzothiazolyl disulfide (MBTS) | 0.75 |
| Thiuram disulfide | 0.25 |

In addition the above stock contained 25 parts of another blend similar to the above except that "Hypalon" 20 was used.

The "Hypalon" solution was painted on the sheet with a brush and the solvent allowed to evaporate. The sheet after three coatings exhibited improved drape, good abrasive resistance, and an improved moisture vapor resistance. Properties of the uncoated and "Hypalon" coated sheets are as follows:

|  | Uncoated Sheet | Coated Sheet (Painted 3 times) with a brush |
|---|---|---|
| Basis Weight (oz./yd.$^2$) | 2.25 | 4.58 |
| Tensile (lbs./in.) | 10.7 | 14.6 |
| Elongation (percent) | 16 | 28.5 |
| Elmendorf Tear (lbs.) | 1.87 | 3.41 |
| MVT (g./m.$^2$/24 hrs.) | 252 | 4.3 |
| Water Resistance (min.) | 1 | 44 |

A contact bonded sheet may also be coated with the "Hypalon" solution before heat fusing. The sheet is then fused at 130° C. under pressure of 30 p.s.i. between two hot platens. Properties of the coated and uncoated sheets are as follows:

|  | Uncoated Sheet | Coated Sheet (Painted once with "Hypalon" solution) |
|---|---|---|
| Basis Weight (oz./yd.$^2$) | 2.3 | 3.93 |
| Tensile (lbs./in.) | 28 | 25 |
| Elongation (percent) | 33 | 35 |
| Elmendorf Tear (lbs.) | 0.55 | 1.1 |
| MVT (g./m.$^2$/24 hrs.) | 72 | 2.7 |
| Water Resistance (min.) | 1 | 60 |

Both methods yield a coated product which may be embossed at 131° C. and 30 p.s.i. The embossed sheets exhibit a deep clear pattern with thin coatings of "Hypalon." This behavior contrasts with that of coatings on other fabrics, for fabrics of the prior art require much thicker coatings to obtain an equivalent clear embossed pattern.

Example XLI

A contact-bonded plexifilamentary sheet of linear polyethylene was laminated with the chlorosulfonated polyethylene film by pressing between two hot platens at 128 to 134° C. under pressure for one to two minutes. The peel strength of the laminate was about two pounds per inch and the structure exhibited improved drape. The chlorosulfonated polyethylene film was prepared from the following ingredients:

| | Parts |
|---|---|
| Chlorosulfonated polyethylene | 100 |
| "Carbowax" 4,000, a paraffin wax | 2.5 |
| "Zalba," a hindered phenol | 2 |
| "Dythal," dibasic lead phthalate | 20 |
| "Atomite Whiting," calcium carbonate | 0–140 |
| Titanium dioxide pigment | 50 |

The amount of filler (calcium carbonate) can be varied without significant effect on the laminated structure properties. Properties of the laminated structure prepared at 130° C. are as follows:

| | Uncoated Sheet | Coated Sheet (Laminated Sheet Structure) |
|---|---|---|
| Basis Weight (oz./yd.$^2$) | 2.50 | 9.0 |
| Tensile (lbs./in.) | 37 | 39 |
| Elongation (percent) | 41 | 45 |
| Elmendorf Tear (lbs.) | 1.33 | 1.8 |
| MVT (g./m.$^2$/24 hrs.) | 9.2 | 0.8 |

Lamination of the sheet may also be carried out on a three roll calender with all three rolls heated. The chlorosulfonated polyethylene stock is fed between the top and the middle roll. The film thus formed is then fed back into the machine simultaneously with a contact bonded or cohesively bonded plexifilamentary sheet of linear polyethylene. The two sheets are fed together into the machine between the middle and bottom roll. This operation causes the plexifilamentary sheet to fuse and simultaneously laminates it to the chlorosulfonated polyethylene film.

As is apparent from the above description, the sheet products of the invention have a great number of utilities. Foremost among these are in the packaging field due to their great strength, tear resistance and shock absorbing ability. Thus, articles and materials packaged in bags, cartons, or wrapping of the novel products of the invention can withstand more and rougher handling than when packaged in conventional wrapping materials, and containers of the novel sheets retain their original condition (strength, continuity, protection they can offer, etc.) far longer than the containers of the usual materials known in the art. The following is a list of end uses for the sheet products of the invention:

Acoustical tile
Animal ground covers
Animal shelters
Auto kickboards
Auto headliners
Awnings
Baby pants
Balloons
Bag closure tapes
Bag reinforcing strips
Bed sheets
Bin liners
Boat covers
Boat sails
Boilable pouches for food
Book covers
Bottle caps
Boxboard
Box car liners
Braille paper
Building paper
Bulk liners
Business machine cards, tapes
Cable end wire wrapping
Camelback
Cartons
Labels
Leather replacement
Luggage
Mulching
Plastic reinforcing
Pond liners
Pressure sensitive tape substrate
Protective clothing
Protective pipe covering
Rainboots
Raincoats
Reinforcing tapes
Release materials
Rice levees
Roofing materials
Roofing underlay
Room dividers and screens
Rug backing
Sanitary napkin covers
Seed and nutrient containing agricultural mat
Shoe fabrics
Shoe polish cloth
Shower curtains
Coated abrasive backing
Concrete curing blanket
Concrete forms
Containers
Conveyor belts
Decorative signs
Diaphragms
Ditch liners
Drainage tubing
Draperies and curtains
Dust bags
Doilies and placemats
Filter cloths
Flashing
Flexible irrigation pipe
Floor mats
Floor tile
Food boxes
Furniture and auto upholstery
Garment bags
Gaskets
Glazing
Industrial bagging
Inflatable toys
Inflatable houses
Interliners
Lampshades
Laundry bags
Silo covers
Sleeping bag shelves
Snow fence
Stencils
Sub-grade moisture vapor barriers
Swimming pool liners
Swimming pool decking
Tags
Tarpaulins
Templates
Temporary equipment and material covers
Temporary siding
Temporary work enclosures
Tents
Ticking
Tracing paper
Traffic striping
Trays, plates and cups
Twisting paper
Typewriter ribbon
Valve packing
Wall coverings
Wall board
Watch bands
Waste baskets
Windbreaks
Window shades In addition to planar sheet structures, a wide variety of products may be made by heat-forming the sheet products in a mold or in a set of forming rolls or by drawing through a die. Typical of the products which can be formed in this manner are:

Refrigerator door and wall panels
Corrugated roofing or siding for buildings
Pipe
Dishes
Toys
Autombile trim
Trays
Counter tops
Baseboards and interior trim for houses and buildings
Window sills

What is claimed is:

1. A coherent, flexible, nonwoven fibrous sheet from which there can be removed continuous lengths of plexifilamentary strand material, said strand material being disposed in multidirectional overlapping and intersecting arrangement throughout said sheet, lying generally parallel to the major plane of said sheet, and being self-bonded to provide a sheet density greater than 7 lbs./ft.$^3$ and a tensile strength above 0.3 lb./in.//oz./yd.$^2$; said strand material further being composed of networks having a surface area greater than 2 m.$^2$/g., comprising a three-dimensional integral plexus of synthetic organic, crystalline polymeric, fibrous elements, said elements being coextensively aligned with the network axis and having the structural configuration of oriented film-fibrils, an average film thickness of less than 4 microns and an average electron diffraction orientation angle of less than 90°.

2. The sheet of claim 1 wherein said crystalline polymeric, fibrous elements are comprised of linear polyethylene.

3. The sheet of claim 1 wherein said crystalline polymeric, fibrous elements are comprised of a blend of linear polyethylene and minor amounts of branched polyethylene.

4. The sheet of claim 1 wherein said networks are highly fibrillated and transversely spread networks.

5. The sheet of claim 1 impregnated with a synthetic polymer.

6. A laminate of the sheet of claim 1 and a coplanar film.

7. The sheet of claim 1 coated with a synthetic polymer.

8. A cohesively-bonded, nonwoven fibrous sheet having a sheet density greater than 7 lbs./ft.$^3$ and a tensile strength above 0.3 lb./in.//oz./yd.$^2$, said sheet being formed by the compacting and heating of a multidirectional overlapping and intersecting arrangement of plexifilamentary strand material, said strand material being composed of networks having a surface area greater than 2 m.$^2$/g., comprising a three-dimensional integral plexus of synthetic organic, crystalline polymeric, fibrous elements, said elements being coextensively aligned with the network axis and having the structural configuration of oriented film-fibrils, an average film thickness of less than 4 microns and an average electron diffraction orientation angle of less than 90°; said heating and compacting being effected to create fusion bonding sites between said fibrous elements.

9. The sheet of claim 8 wherein said crystalline polymeric, fibrous elements are comprised of linear polyethylene.

10. The sheet of claim 8 impregnated with a synthetic polymer.

11. The sheet of claim 8 coated with a synthetic polymer.

12. A laminate of the sheet of claim 8 and a coplanar film.

13. The laminate of claim 12 wherein the coplanar film is an oriented synthetic polymeric film.

14. The laminate of claim 12 wherein the coplanar film is a metallic foil.

15. A coherent, flexible, nonwoven fibrous sheet formed of continuous lengths of plexifilamentary strand material and having a pattern of raised and depressed portions throughout the major plane of the sheet, said strand material being disposed in multidirectional overlapping and intersecting arrangement throughout said sheet, lying generally parallel to the major plane of said sheet, and being self-bonded in said depressed portions to provide a sheet density greater than 1.9 lbs./ft.$^3$ and a tensile strength above 0.3 lb./in.//oz./yd.$^2$; said strand material further being composed of networks having a surface area greater than 2 m.$^2$/g., comprising a three-dimensional integral plexus of synthetic organic, crystalline polymeric, fibrous elements, said elements being coextensively aligned with the network axis and having the structural configuration of oriented film-fibrils, an average film thickness of less than 4 microns and an average electron diffraction orientation angle of less than 90°.

16. The sheet of claim 15 wherein said crystalline polymeric, fibrous elements are comprised of linear polyethylene.

17. The sheet of claim 15 impregnated with a synthetic polymer.

18. A laminate of the sheet of claim 15 and a coplanar film.

19. The sheet of claim 15 coated with a synthetic polymer.

20. A process for producing a coherent, flexible, nonwoven fibrous sheet comprising providing plexifilamentary strand material composed of at least one continuous network having a surface area greater than 2 m.$^2$/g., comprising a three-dimensional integral plexus of synthetic organic, crystalline polymeric, fibrous elements, said elements being coextensively aligned with the network axis and having the structural configuration of oriented film-fibrils, an average film thickness of less than 4 microns and an average electron diffraction orientation angle of less than 90°, laying the strand material on a surface in multidirectional overlapping and intersecting arrangement to form a batt and compacting said batt in a direction normal to the plane of the batt to an extent sufficient to produce a self-bonded sheet having a bulk density greater than 7 lbs./ft.$^3$ and a tensile strength greater than 0.3 lb./in.//oz./yd.$^2$.

21. The process of claim 20 wherein said crystalline polymeric, fibrous elements are composed of linear polyethylene.

22. The process of claim 20 wherein the prepared batt is compacted by calendering.

23. The process of claim 20 wherein said compacting is followed by a heat treatment to cohesively bond said fibrous elements to one another by fusion.

24. The process of claim 20 wherein said filamentary strand material is provided as a freshly extruded, highly fibrillated material which has been spread in width.

25. A process for producing a coherent, flexible, nonwoven fibrous sheet comprising preparing plexifilamentary strand material composed of at least one continuous network having a surface area greater than 2 m.$^2$/g., comprising a three-dimensional integral plexus of synthetic organic, crystalline polymeric, fibrous elements, said elements being coextensively aligned with the network axis and having the structural configuration of oriented film-fibrils, an average film thickness of less than 4 microns and an average electron diffraction orientation angle of less than 90°, laying the strand material on a surface in multidirectional overlapping and intersecting arrangement to form a batt and embossing said batt in a direction normal to the plane of the batt to create a pattern of raised and depressed portions and to produce a self-bonded sheet having a bulk density greater than 1.9 lbs./ft.$^3$ and a tensile strength above 0.3 lb./in.//oz./yd.$^2$.

References Cited in the file of this patent

UNITED STATES PATENTS

| | | |
|---|---|---|
| 2,464,301 | Francis | Mar. 15, 1949 |
| 2,689,199 | Pesce | Sept. 14, 1954 |
| 2,795,290 | Butsch et al. | June 11, 1957 |
| 2,810,426 | Till et al. | Oct. 22, 1957 |
| 2,988,469 | Watson | June 13, 1961 |

UNITED STATES PATENT OFFICE
CERTIFICATE OF CORRECTION

Patent No. 3,169,899                        February 16, 1965

Walter Steuber

It is hereby certified that error appears in the above numbered patent requiring correction and that the said Letters Patent should read as corrected below.

Column 5, line 15, for "second" read -- ground --; column 6, line 75, for "stand" read -- strand --; column 7, line 60, for "cold" read -- coin --; column 11, line 32, for "mxied" read -- mixed --; column 13, line 29, for "bisis" read -- basis --; line 33, for "bossed" read -- embossed --; line 39, for "pipe" read -- wipe --; same column 13, line 69, for "and" read -- an --.

Signed and sealed this 3rd day of August 1965.

(SEAL)
Attest:

ERNEST W. SWIDER                           EDWARD J. BRENNER
Attesting Officer                              Commissioner of Patents